United States Patent [19]
Warncke et al.

[11] 3,785,333
[45] Jan. 15, 1974

[54] ALARM FOR SENSING A REDUCTION OF GAS SUPPLY PRESSURE FOR RESPIRATORS

[75] Inventors: Ernst Warncke; Hans Haas, both of Lubeck, Germany

[73] Assignee: Dragerwerk Aktiengesellschaft, Lubeck, Germany

[22] Filed: June 2, 1972

[21] Appl. No.: 259,308

[30] Foreign Application Priority Data
June 15, 1971 Germany.................P 21 29 529.4

[52] U.S. Cl................. 116/70, 128/142.3, 137/557
[51] Int. Cl. ............................................ G01l 19/12
[58] Field of Search..................... 116/70, 112, 117; 137/557; 128/142.3

[56] References Cited
UNITED STATES PATENTS

| | | | |
|---|---|---|---|
| 3,056,378 | 10/1962 | Simmonds............................. | 116/70 |
| 3,091,213 | 5/1963 | Maskell et al. ....................... | 116/70 |
| 3,224,409 | 12/1965 | Fenger et al.......................... | 116/70 |
| 3,288,101 | 11/1966 | Miller et al. .......................... | 116/65 |
| 3,524,424 | 8/1970 | Roland.................................. | 116/70 |
| 3,584,596 | 6/1971 | Westcott............................... | 116/70 |
| 3,611,981 | 10/1971 | Warncke............................... | 116/70 |
| 3,544,196 | 4/1966 | Replogle............................... | 137/557 |

Primary Examiner—Louis J. Capozi
Attorney—John J. McGlew et al.

[57] ABSTRACT

An alarm for sensing a reduction of gas supply pressure to a respirator comprises a housing having a first chamber with a gas pressure monitoring inlet connection for connection to the gas supply container and a medium pressure line for actuating fluid which is connected into the first chamber but which is divided from the monitoring gas connection by a diaphragm. A second chamber in the housing includes a diaphragm sealing arrangement dividing the chamber into a close zone and a control zone. The housing includes a first passage between the actuating fluid zone and the control zone which has a valve seat at the connection of the actuating fluid zone which is closed by a first valve body which is carried on the diaphragm and which is urged by the diaphragm under normal operating pressure to close the valve seat and close off the first passage. A monitoring spring biases the body in a direction to move off the valve seat when the monitoring pressure reduces by a predetermined amount. An alarm conduit having a fluid-operated alarm, such as a whistle, is connected to the control zone and it has a valve seat at the connection to the control zone which is sealed by a second valve body carried by the sealing diaphragm arrangement and which is normally opened by a biasing spring to permit the control medium to flow through the alarm conduit and actuate the whistle. The sealing means which carries the valve body is such that a throttle passage extends between the control zone and the closed zone in order to permit flow of the fluid from the control zone into the closed zone and a closing of the alarm conduit to, thus, cause a stopping of the flow of the medium pressure fluid.

5 Claims, 1 Drawing Figure

PATENTED JAN 15 1974 3,785,333
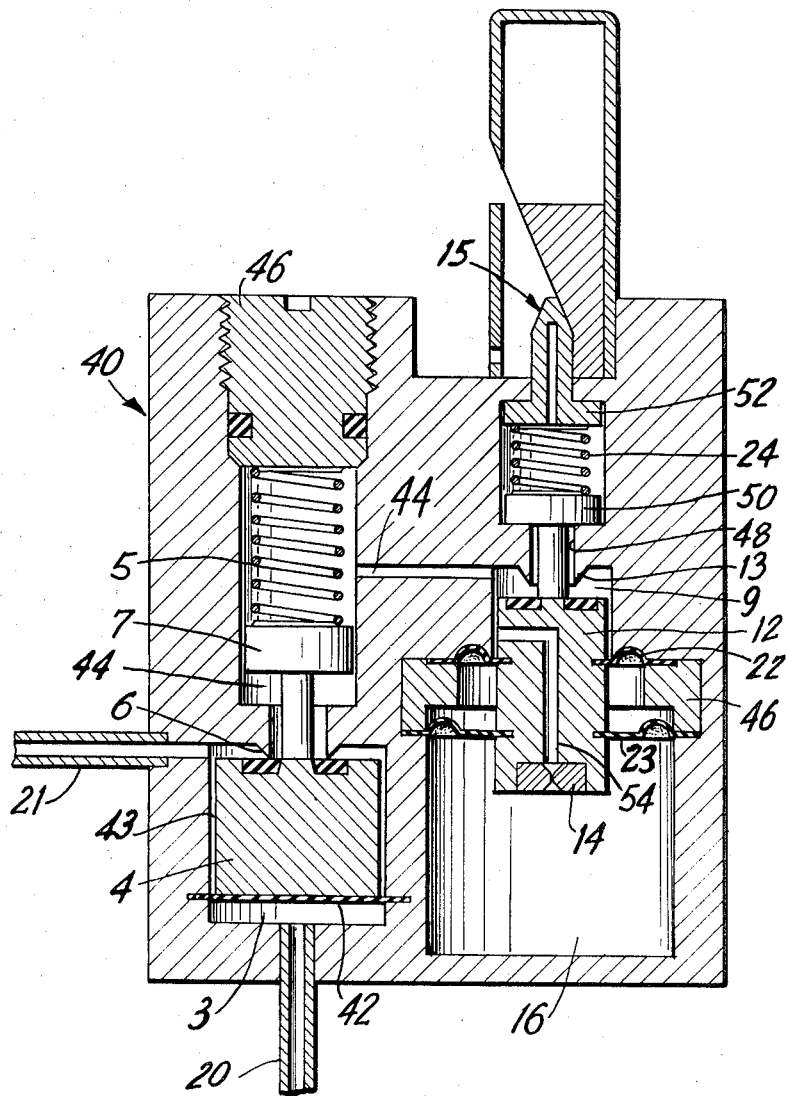

ALARM FOR SENSING A REDUCTION OF GAS SUPPLY PRESSURE FOR RESPIRATORS

BACKGROUND OF THE INVENTION

1. Field of the Invention

This invention relates in general to the construction of gas pressure warning devices and, in particular, to a new and useful device for indicating the reduction in pressure of the feed line from a gas container to a respirator.

2. Description of the Prior Art

The present invention relates particularly to alarm signal devices for respirators which are fed from a compressed gas supply and which includes a compressed gas control valve for operating a signal device for indicating any reduction in the gas pressure. A device of this nature is disclosed and described in U.S. Pat. No. 3,611,981 which includes a construction in which the line leading to the alarm device is provided with a second pressure control valve having control means which is pressurized on one side by the pressure of a control fluid in a control zone for operating the alarm device and has an opposite side which is covered completely by a housing which defines a closed zone which is closed on all sides. The closed zone communicates by a throttle line to the control zone. After release of the pressure control valve installed in the signal or alarm line, the operating fluid will flow from the control zone to the second pressure controlled valve which is initially opened by the pressure weighing on its control means and into the alarm line. The alarm operating fluid also flows through the throttle in the connecting line to the closed zone until practically the same pressure as the opening pressure is built up in this zone. This equalization permits the second pressure control valve to be closed because it acts on a greater valve area than on the control zone side. In the meantime, the control fluid passes through the alarm device to operate an alarm such as a whistle. The interval of time during which the alarm whistle sounds, can be regulated for example by selection of the throttle cross-section of the communicating throttle passage between the control zone and the closed zone. It is generally sufficient that the alarm signal sounds for about 15 – 30 seconds before it is discontinued.

SUMMARY OF THE INVENTION

In accordance with the invention, there is provided an alarm device which is an improvement over the device disclosed in the U.S. Pat. No. 3,611,981 inasmuch as it includes control means on the control zone side of the second pressure valve which has a smaller area exposed to the pressure than the opposite side which is in the closed zone. In addition, the valve that regulates the supply of the control fluid to the signalling device includes a control body or valve which is spaced from its valve seat in an opened position in the normal initial operation. The construction has the advantage that, in the case of an alarm after the release of a first pressure control valve installed in the control fluid line, the compressed gas can immediately flow to the alarm device. The wearer of the respirator therefore will be immediately alerted to the underpressure after the opening of the first pressure control valve showing that the supply of the compressed gas is coming to an end. In addition, as the respirator is taken into operation when the first pressure control device is opened so that a small amount of compressed gas flows off into the control device for operating the alarm, this small amount of compressed gas can flow off from the control device through the opened second valve so that, after a short whistle tone is sounded, the readiness or intact operation of the alarm device is indicated.

In accordance with a simple embodiment of the device, the control valve for regulating the control fluid comprises a valve body which is carried on a double membrane or double diaphragm which is pressurized by fluid from a medium pressure line which flows to the alarm device whenever the first pressure control valve is opened. The control membrane is located adjacent the control zone and it has a smaller area exposed to pressure than the opposite closed zone membrane which is exposed to the closed zone. The second pressure control valve is advantageously under the action of a spring which acts in an opening direction to maintain the valve in an open position. The movable closure member or diaphragm of the first pressure control valve is pressurized by the high pressure of the gas supply. This construction produces the advantage that the first pressure control valve is closed immediately after the opening of the compressed gas bottle.

Accordingly, it is an object of the invention to provide a gas signal alarm device which operates from a fluid control pressure which is directed into a control zone by the action of a first pressure-operated valve when the pressure of the supply drops below a predetermined amount and which passes through the control zone through a control passage opened by a second pressure-operated valve which is biased into an open position to permit flow to the signal alarm to operate the signal and which also includes a throttle passage from the control zone into a closed zone to permit the equalizing flow of pressure fluid from the control zone to the closed zone in order to restore the second pressure-operated valve to a closed position to shut off the control fluid supply, and wherein the valve is carried by a valve body which is responsive on one side to the control zone pressure acting through a smaller area than on the opposite side which is exposed to a closed zone area acting through a greater valve control area to influence the movement of the valve.

A further object of the invention is to provide a signalling device which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The only FIGURE of the drawing is a schematic transverse sectional view of a gas pressure alarm device for a respirator constructed in accordance with the invention.

GENERAL DESCRIPTION OF THE PREFERRED EMBODIMENT

Referring to the drawing in particular, the invention embodied therein comprises, an alarm device housing, generally designated 40, which includes a first chamber with a gas pressure monitoring inlet connection 20 which is connected to a gas supply container (not shown) between a gas bottle or container and a respirator and which is divided by a diaphragm control valve 42 into a high pressure zone 3 which communicates with the conduit 20 and a control fluid pressure zone 43 which communicates with a medium pressure line or control fluid line 21 which is connected through a reducer (not shown) to the high pressure line 20. The first pressure-reducing valve comprises a flexible diaphragm 42 with a valve body 4 which is seated against a valve seat 6 of a first passage 44 which extends between the control fluid zone 43 and a control zone 9 of a second chamber defined in the housing 40. The control piston or body 4 is urged by the pressure in the high pressure zone 3 against the seat 6 to close the passage 44 whenever the pressure in the control zone 3 is reduced by a predetermined amount, the valve body 4 is biased in a direction away from the seat 6 by an action of a control spring 5 which is compressed between a plunger 7 secured to the valve body 4 and a threaded stopper 46 which closes the housing bore.

When the device is used with a respirator; after the respirator gas supply bottle shut-off valve is opened, compressed oxygen will flow, for example, with initial pressure of 200 kilopounds per square cm through the high pressure line 20 and into the high pressure zone 3 to act on the diaphragm 42 to close the valve body 4 against the seat 6. As soon as the bottle pressure is dropped to the alarm pressure of, for example, 40 kilopounds per square cm, the force of the spring 5 predominates, which acts on the plunger 7 to move the control piston body portion 4 off its valve seat 6. This permits compressed gas or control fluid to pass from the control zone 43 through a passage 44 which continues through the chamber of the spring 5 through the control zone 9.

The control zone 9 is defined on one end of a second chamber in said housing and it is separated from an opposite or completely closed zone 16 at the opposite end by a second pressure operated valve having sealing means which comprises first and second diaphragms 22 and 23 carried by a valve body 12. The two diaphragms or membranes 22 and 23 are connected at their radial outer peripheries by a holding piece 46 and at their inner peripheries, they are secured into the valve body 12. In the pressureless state, the valve body 12 is held in an open position at a spaced location from its valve seat 13 located at the end of an alarm conduit 48 by an opening spring 24 which is compressed between a plunger 50 and an alarm nozzle 52 of a whistle or similar alarm device 15.

The valve body 12 includes a throttle passage 54 which terminates in a throttle nozzle 14 which discharges into the closed zone 16.

The compressed gas which flows into the control zone 9 flows through the opening defined within the valve seat 13 and through the alarm conduit 48 to cause a sounding of the whistle as soon as the first pressure operated valve 42 is opened to pass the control fluid through the control zone. Part of the control fluid flows through the nozzle 14 into the closed zone 16 and, after awhile, a pressure equalization occurs between the control zone 9 and the closed zone 16. Because the free area of the diaphragm 23 is greater than the free area of the diaphragm 22, upon equalization of the pressures between zones and line 16, the pressure acting in a closing direction on the valve closure body 12 is greater than the force of the biasing spring 24 so that the valve 12 is closed against the seat 13 to shut off the alarm conduit 48. Because the inflow of the partial stream of compressed gas to the signal 15 is shut off, there is no further loss of the compressed gas.

The device is equally applicable with a construction which does not use the two diaphragms 22 and 23 by designing the valve body 12 such that the area exposed on one side to the control zone is made smaller than the area exposed on the opposite side to the closed zone pressure. For example, the valve closure body 12 may be designed as a double piston with two different diameters.

Whenever the respirator is placed into operation by opening the shut-off valve of the compressed gas container, the compressed gas will flow through the high pressure line 20 into the high pressure zone 3 and the spring 5 will maintain the valve 42 in an open position so that the medium pressure line 21 permits the flow of control fluid through the control fluid passage 44 to the control zone 9 of the alarm device. Before the valve 42 closes, a certain quantity of compressed gas can flow through the alarm conduit 48 back to a signal device 15 so that the warning signal sounds briefly and gives an indication that the alarm device is ready for operation.

Another advantage of this system of the invention is that, after closing of the valve 42, the compressed gas present in the device for controlling the alarm can flow through the alarm passage 48. A residual pressure in the zone 16 cannot be maintained permanently.

While a specific embodiment of the invention has been shown and described in detail to illustrate the application of the principles of the invention, it will be understood that the invention may be embodied otherwise without departing from such principles.

What is claimed is:

1. An alarm device for sensing the drop off of pressure between a gas supply container and a respirator, comprising a housing having a control fluid passage therein, a first pressure-operated valve in said control fluid passage having a discharge adapted to be opened in response to the pressure in the line between the gas supply and the respirator to open the conduit for the flow of the control fluid when the pressure in the line drops below a predetermined amount, an alarm conduit having a pressure fluid-operated alarm device, a control fluid passage defining a control zone connected between the discharge of said first pressure-operated valve and said alarm conduit and having a second pressure-operated valve therein, said housing defining a closed zone opposite to said control zone, said second pressure-operated valve being exposed on one side to the pressure of said control zone and on the opposite side by said closed zone and being movable to open and close said alarm conduit, the portion of said valve exposed to said control zone being of a lesser area than the portion on its opposite side exposed to said closed zone, and a throttle passage communicating between said control zone and said closed zone for equalizing the pressure between said zones, the greater area on said valve in said closed zone forcing said valve to a closed position to close off said alarm circuit after the pressures are equalized.

2. An alarm device according to claim 1, wherein said second pressure control valve comprises a valve body, first and second diaphragms supporting said valve body in said housing between said closed zone and said control zone, one of said diaphragms being exposed to said control pressure and being of a lesser area than the other which is exposed to said closed zone pressure.

3. An alarm device according to claim 1, including a control spring acting on said second pressure control valve to urge it into an open position.

4. An alarm device according to claim 1, wherein said first pressure control valve comprises a valve body and a diaphragm supporting said valve body, the diaphragm being exposed on one side to the high pressure line, and a spring acting on said valve body in a direction against the force of said high pressure line.

5. A gas pressure alarm for respirators for sensing the drop off of pressure between a gas supply container and the respirator, comprising a housing having a first chamber with a gas pressure monitoring inlet connection for connection to the gas supply container, a medium pressure line for an actuating fluid connected into said first chamber, a diaphragm dividing said first chamber into an actuating fluid zone communicating with said medium pressure line and a high pressure gas monitoring zone communicating with said gas pressure monitoring inlet connection, a second chamber in said housing, sealing means dividing said second chamber into a closed zone and a control zone, a first passage between said actuating fluid zone and said control zone having a first valve seat at the connection to said actuating fluid zone, a first valve body carried on said diaphragm and being urged by said diaphragm under the normal operating pressure in said monitoring zone to close upon said first valve seat to close off said first passage, a monitoring force means biasing said first body in a direction to move it off said valve seat when said monitoring pressure is reduced by a predetermined amount; an alarm conduit having a fluid-operated alarm therein connected to said control zone and having an alarm conduit valve seat at the connection thereof to said control zone, said sealing means having a second valve body closeable against said alarm conduit valve seat, and opening spring biasing said second valve body into a normal open position, said sealing means having a throttle passage extending between said control zone and said closed zone for equalizing the pressure between said control zone and said closed zone, said sealing means defining an area on the control zone which is less than the area on said closed zone so as to urge said valve body to close off said alarm conduit after the pressure has been equalized between said control zone and said closed zone by flow through said throttle passage.

* * * * *